(12) United States Patent
Masuzawa et al.

(10) Patent No.: US 11,970,896 B2
(45) Date of Patent: Apr. 30, 2024

(54) OPENING/CLOSING CONTROL DEVICE AND OPENING/CLOSING CONTROL METHOD

(71) Applicant: ALPS ALPINE CO., LTD., Tokyo (JP)

(72) Inventors: Kenji Masuzawa, Miyagi (JP); Shinichi Endo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 401 days.

(21) Appl. No.: 17/457,762

(22) Filed: Dec. 6, 2021

(65) Prior Publication Data

US 2022/0205300 A1 Jun. 30, 2022

(30) Foreign Application Priority Data

Dec. 25, 2020 (JP) ................................ 2020-217509

(51) Int. Cl.
*A61G 7/015* (2006.01)
*B60J 1/17* (2006.01)
*E05F 15/41* (2015.01)
*E05F 15/695* (2015.01)

(52) U.S. Cl.
CPC ................. *E05F 15/41* (2015.01); *B60J 1/17* (2013.01); *E05F 15/695* (2015.01); *E05Y 2900/55* (2013.01)

(58) Field of Classification Search
CPC .... E05F 15/41; E05F 15/695; E05Y 2900/55; B60J 1/17; A61G 7/015
See application file for complete search history.

(56) References Cited

U.S. PATENT DOCUMENTS

2008/0036406 A1* 2/2008 Kawai ................. E05F 15/695
318/283
2016/0166453 A1* 6/2016 Furman ................. A61G 7/015
700/275

FOREIGN PATENT DOCUMENTS

JP 2018-197426 12/2018

* cited by examiner

*Primary Examiner* — Cortez M Cook
(74) *Attorney, Agent, or Firm* — IPUSA, PLLC

(57) ABSTRACT

With respect to an opening/closing control device for controlling an opening/closing operation of an opening/closing body driven by a motor, the opening/closing control device includes a current detector, a voltage detector, a processor, and a memory. The processor calculates the speed of the opening/closing body based on a change in the detected position of the opening/closing body, and decreases the pinch threshold value in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

8 Claims, 12 Drawing Sheets

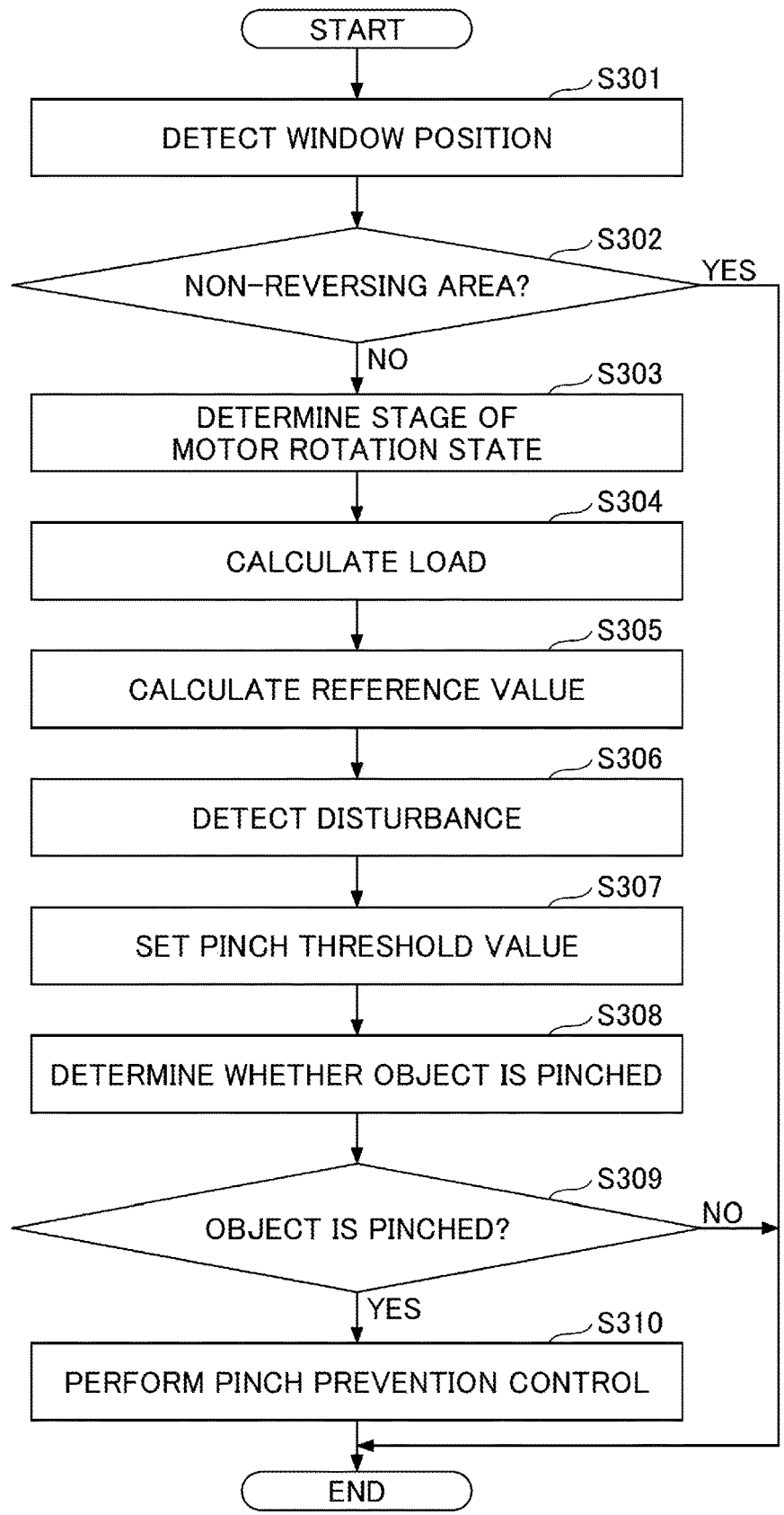

FIG.4

| | MOTOR ROTATION | PINCH DETERMINATION | | PINCH THRESHOLD VALUE | STABILITY POINT SEARCH | DISTURBANCE DETECTION |
|---|---|---|---|---|---|---|
| | | SOFT OBJECT | HARD OBJECT | | | |
| FIRST STAGE (S1) | UNSTABLE | NOT PERFORMED | NOT PERFORMED | | PERFORMED | NOT PERFORMED |
| SECOND STAGE (S2) | UNSTABLE | PERFORMED | NOT PERFORMED | HIGH | PERFORMED | NOT PERFORMED |
| THIRD STAGE (S3) | UNSTABLE | PERFORMED | PERFORMED | HIGH | NOT PERFORMED | PERFORMED |
| FOURTH STAGE (S4) | STABLE | PERFORMED | PERFORMED | NORMAL | NOT PERFORMED | PERFORMED |

OPENING/CLOSING CONTROL DEVICE AND OPENING/CLOSING CONTROL METHOD

CROSS-REFERENCE TO RELATED APPLICATION

This patent application is based on and claims priority to Japanese Patent Application No. 2020-217509 filed on Dec. 25, 2020, the entire contents of which are incorporated herein by reference.

BACKGROUND OF THE INVENTION

1. Field of the Invention

The present disclosure relates to an opening/closing control device and an opening/closing control method.

2. Description of the Related Art

Patent Document 1 discloses a technique in which, in an opening/closing control device configured to perform a pinch prevention control to reverse the rotation of a motor when a load calculated based on the current flowing through the motor exceeds a pinch threshold value, erroneous determination that an object is pinched by an opening/closing body is prevented from being made and the rotation of the motor is prevented from being erroneously reversed, by increasing the pinch threshold value when an external disturbance or the like that causes a change in the calculated load is detected.

However, the inventors of the present disclosure have found that the technique described in Patent Document 1 still causes erroneous determination that the object is pinched by the opening/closing body and there is a possibility that the rotation of the motor is not reversed despite the fact that the pinch of the object actually occurs.

RELATED-ART DOCUMENTS

Patent Document

Patent Document 1: Japanese Laid-Open Patent Publication No. 2018-197426

SUMMARY OF THE INVENTION

According to one aspect of an embodiment, an opening/closing control device for controlling an opening/closing operation of an opening/closing body driven by a motor, includes a current detector configured to detect a current flowing to the motor, a voltage detector configured to detect a voltage supplied to the motor, a processor, and a memory storing program instructions. The program instructions cause the processor to detect a position of the opening/closing body based on rotation of the motor, calculate a load of the opening/closing body in the opening/closing operation based on the current detected by the current detector, set a pinch threshold value that defines an upper limit of the calculated load, determine that an object is pinched by the opening/closing body in a case where the calculated load exceeds the upper limit defined by the pinch threshold value, and perform a pinch prevention control process in response to determining that the object is pinched, the pinch prevention control process reversing the rotation of the motor. The processor calculates a speed of the opening/closing body based on a change in the detected position of the opening/closing body, and decreases the pinch threshold value in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

According to one embodiment, the pinch of an object caused by an opening/closing body can be detected with high accuracy.

BRIEF DESCRIPTION OF THE DRAWINGS

FIG. 3 is a flowchart illustrating an example of a procedure performed by the processing unit according to the embodiment;

FIG. 4 is a diagram illustrating an example of stages of the opening/closing control device according to the embodiment;

DESCRIPTION OF THE PREFERRED EMBODIMENTS

In the following, an opening/closing control device 100 according to an embodiment will be described with reference to the drawings.

Configuration of the Opening/Closing Control Device 100

Figure 1:
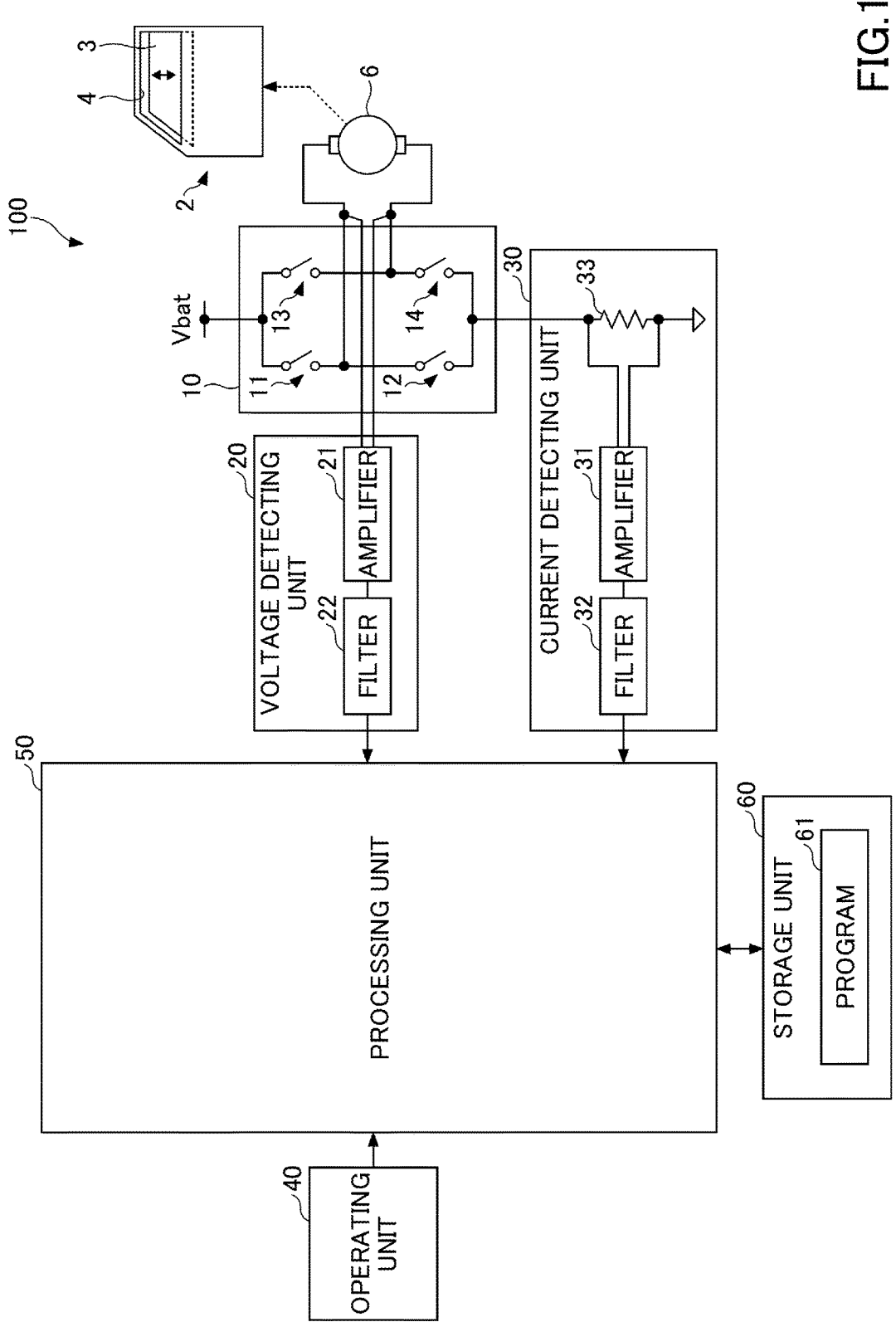
FIG. 1 is a schematic diagram illustrating an example configuration of an opening/closing control device according to an embodiment.

FIG. 1 is a diagram illustrating an example of a configuration of the opening/closing control device 100 according to the embodiment. The opening/closing control device 100 according to the embodiment is a device that controls an opening/closing operation of a window 3 attached to a window frame 4 of a door 2 in a vehicle by controlling an operation of a motor 6.

As illustrated in FIG. 1, the opening/closing control device 100 includes a motor driving circuit 10, a voltage detecting unit 20 (i.e., a voltage detector), a current detecting unit 30 (i.e., a current detector), an operating unit 40, a processing unit 50, and a storage unit 60.

The motor driving circuit 10 generates a voltage for driving the motor 6 in accordance with a control signal supplied from the processing unit 50. In the example illustrated in FIG. 1, the motor driving circuit 10 includes four switch elements 11 to 14 constituting a full bridge circuit. The switch element 11 and the switch element 12 are connected in series between a power supply voltage Vbat, such as a battery, and ground, and a connection midpoint of the switch element 11 and the switch element 12 is connected to one input terminal of the motor 6. The switch element 13 and the switch element 14 are connected in series between the power supply voltage Vbat and ground, and a connection midpoint of the switch element 13 and the switch element 14 is connected to the other input terminal of the motor 6. The motor 6 is, for example, a DC motor, and a direction of the rotation is reversed according to the polarity of the voltage applied to the two input terminals.

The voltage detecting unit 20 detects the voltage supplied to the motor 6. In the example illustrated in FIG. 1, the voltage detecting unit 20 includes an amplifier 21 and a filter 22. The amplifier 21 amplifies the voltage applied to the two input terminals of the motor 6 at a predetermined gain. The filter 22 removes switching frequency components from the output signal of the amplifier 21 and outputs a signal corresponding to the average voltage supplied to the motor 6. The voltage detecting unit 20 includes an AD converter and outputs a digital signal corresponding to the voltage supplied to the motor 6 to the processing unit 50.

The current detecting unit 30 detects the current flowing to the motor 6. In the example illustrated in FIG. 1, the current detecting unit 30 includes a shunt resistor 33, an amplifier 31, and a filter 32. The shunt resistor 33 is provided in a current path between a full bridge circuit (the switch elements 11 to 14) and ground of the motor driving circuit 10 to produce a voltage corresponding to the current flowing to the motor 6. The amplifier 31 amplifies the voltage generated in the shunt resistor 33 with a predetermined gain. The filter 32 removes a component of the switching frequency from the output signal of the amplifier 31 and outputs a signal corresponding to the average current flowing to the motor 6. The current detecting unit 30 includes an AD converter and outputs a digital signal corresponding to the current flowing to the motor 6 to the processing unit 50.

The operating unit 40 is a device for inputting, to the processing unit 50, a signal for a user to operate an opening/closing operation of the window 3 and includes, for example, a switch.

The processing unit 50 controls an operation of the motor 6 based on the voltage detected by the voltage detecting unit 20 and the current detected by the current detecting unit 30. The processing unit 50 includes, for example, a computer that executes processes according to instruction code of a program stored in the storage unit 60. The processing unit 50 may perform all the processes by using the computer, or perform at least some of the processes by using dedicated hardware circuitry (such as random logic).

The storage unit 60 stores a program 61 of the computer in the processing unit 50, constant data used in the processing of the processing unit 50, variable data temporarily retained during the processing of the processing unit 50, and the like. The storage unit 60 includes a storage device, such as a DRAM, an SRAM, a flash memory, a hard disk drive, or the like.

The program 61 may be stored in the storage unit 60 in advance, or the program 61 may be downloaded from another server or the like via an interface device, which is not illustrated, and may be stored in the storage unit 60, or the program 61 may be read from a non-transitory tangible medium (an optical disk, a USB memory, or the like) by a reading device, which is not illustrated, and may be stored in the storage unit 60.

Functional Configuration of the Processing Unit 50

Figure 2:
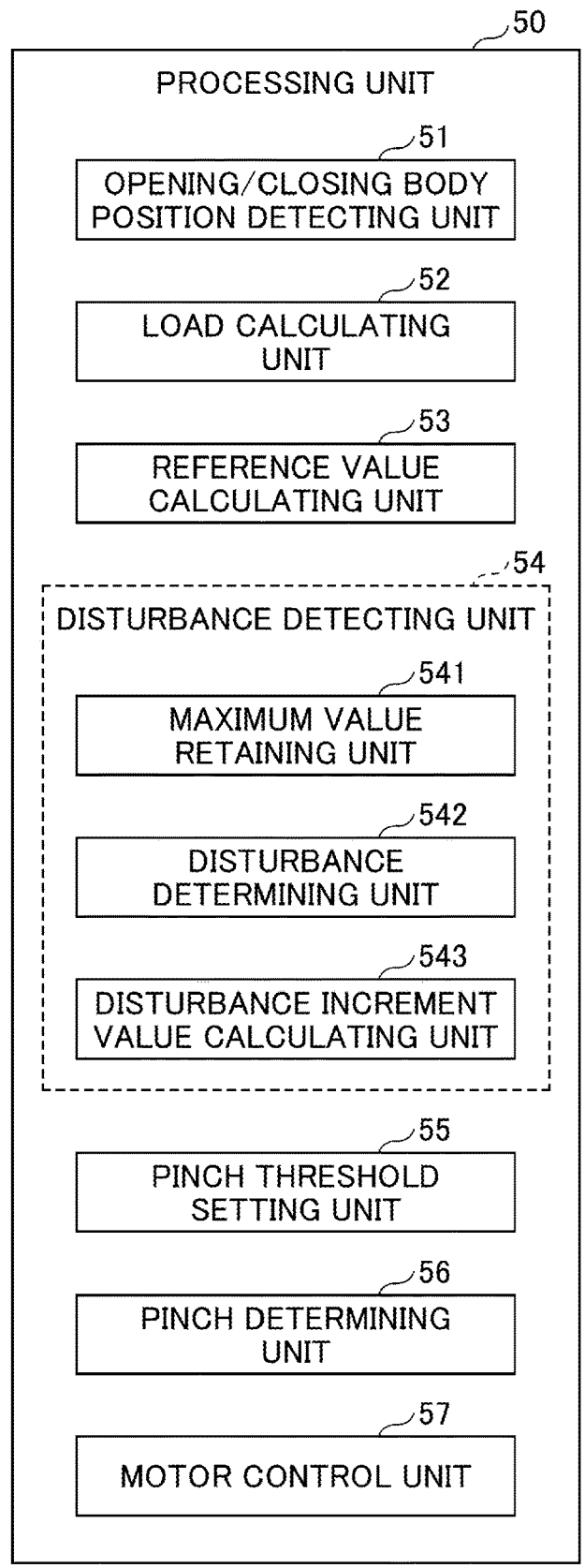
FIG. 2 is a block diagram illustrating a functional configuration of a processing unit according to the embodiment.

FIG. 2 is a block diagram illustrating a functional configuration of the processing unit 50 according to the embodiment. As illustrated in FIG. 2, the processing unit 50 includes an opening/closing body position detecting unit 51, a load calculating unit 52, a reference value calculating unit 53, a disturbance detecting unit 54, a pinch threshold setting unit 55, a pinch determining unit 56, and a motor control unit 57.

The opening/closing body position detecting unit 51 detects a position of the window 3 in the opening/closing operation of the window 3. For example, the opening/closing body position detecting unit 51 detects the position of the window 3 based on the ripple generated in the current flowing to the motor 6 every time the motor 6 rotates by a certain angle. Specifically, the opening/closing body position detecting unit 51 acquires a ripple counter value corresponding to the rotation amount of the motor 6 as information representing the position of the window 3 by extracting and counting the ripple generated in the current flowing to the motor 6.

If a device (a Hall sensor or the like) that generates a pulse every time the motor 6 rotates by a certain angle is provided, the opening/closing body position detecting unit 51 may acquire a pulse counter value corresponding to the rotation amount of the motor 6 by counting the pulses. Alternatively, the opening/closing body position detecting unit 51 may detect the position of the window 3 by mechanical means such as a limit switch, electrical means using the electrical resistance or capacitance, or optical means using optical transmission or reflection.

The load calculating unit 52 calculates a load F in the opening/closing operation of the window 3 based on the current detected by the current detecting unit 30 (hereinafter, referred to as the "motor current Im") and the voltage detected by the voltage detecting unit 20 (hereinafter, referred to as the "motor voltage V"). Specifically, the load calculating unit 52 calculates the load F in which a first load component F1 proportional to the motor current Im, and a second load component F2 proportional to the angular acceleration of the rotation of the motor 6 that is approximated based on the motor current Im and the motor voltage V, are combined by the following equation (1).

[Eq. 1]

$$F(n) = F1(n) + F2(n) \qquad (1)$$

The load calculating unit 52 calculates the load F every predetermined time duration Ts based on the motor current Im and the motor voltage V detected at the predetermined time duration Ts by the current detecting unit 30 and the voltage detecting unit 20. "n" in Eq. 1 is an integer indicating respective processing cycles in a periodic calculation process of the calculated load F. If a value of "n" increases by one, the order of the process cycle proceeds one step further (time advances by the predetermined time duration Ts). Thus, "n" can be regarded as a numerical value representing the time in units of the predetermined time duration Ts. In the following description, "n" may be used as a numerical value representing the time.

The first load component F1(n) is expressed by the following equation (2).

[Eq. 2]

$$F1(n) = \frac{Kt}{L} \cdot Im(n) \qquad (2)$$

In Eq. 2, "Kt" represents a motor torque constant [N·m/A] and "L" represents the amount of movement [m/rad] of the window 3 per unit rotation angle.

The second load component F2(n) is expressed by the following equation (3).

[Eq. 3]

$$F2(n) = -\frac{C}{2\pi} \times \left(\frac{\omega(n) - \omega(n-1)}{Ts}\right) \qquad (3)$$

In Eq. 3, "C" represents a second load component adjustment parameter [N·sec²]. Additionally, "ω(n)" represents the angular speed in the nth processing cycle and "ω(n−1)" represents the angular speed in the (n−1)th processing cycle. As shown in Eq. 3, the second load component F2 is proportional to the rate of change with time of the angular speed ω (the angular acceleration) in the predetermined time duration Ts.

The angular velocity ω(n) is expressed by the following equation (4).

[Eq. 4]

$$\omega(n) = \frac{1}{Ke}(V(n) - Rm \times Im(n)) \qquad (4)$$

In Eq. 4, "Ke" represents a motor back electromotive force constant [V·sec/rad], and "Rm" represents the motor resistance [Ω]. As shown in Eq. 4, the angular speed ω(n) of the rotation of the motor 6 is approximated based on the motor current Im(n) and the motor voltage V(n).

The reference value calculating unit 53 calculates a result of the weighted average of the calculated load F(n) calculated by the load calculating unit 52 as a reference value B(n). For example, every time a new calculated load F(n) is calculated in the load calculating unit 52, the reference value calculating unit 53 calculates a result of the weighted average of the new calculated load F(n) and a past (recent) reference value B(n−1) (hereinafter referred to as the "first weighted average") as a new reference value B(n). The first weighted average is expressed by the following equation (5) with the weight factor "M".

[Eq. 5]

$$B(n) = \frac{(M-1) \times B(n-1) + F(n)}{M} \qquad (5)$$

However, a large change is generated in the calculated load F(n) due to the start-up characteristics of the motor 6 at the beginning of the start-up of the motor 6. If such a change is simply used to calculate the weighted average by using Eq. 5, the reference value B(n) is greatly shifted relative to the calculated load F(n) in a state of no pinch, and this tends to cause an error in the pinch determination. Therefore, the reference value calculating unit 53 appropriately changes the reference value B(n) to be used as a starting point of the weighted average, in accordance with the range of the value of the calculated load F(n) and the trend of the change during the initial period after the motor 6 starts. Hereinafter, the reference value B(n) to be used as the starting point of the weighted average may be referred to as a "stability point". Additionally, a process of changing the stability point after the motor 6 starts may be referred to as a "stability point search process".

The reference value calculating unit 53 limits the range of the reference value B(n) in the initial period after the motor 6 starts, as the stability point search process. That is, if the new calculated load F(n) exceeds a maximum load Bmax, the reference value calculating unit 53 sets the new reference value B(n) to the maximum load Bmax, and if the new calculated load F(n) is less than a minimum load Bmin, the reference value calculating unit 53 sets the new calculated load F(n) to the minimum load Bmin.

If the decrease amount "F(n−p1)−F(n)" of the calculated load F per predetermined time duration p1 exceeds a first change threshold value ΔFp1 in the initial period after the motor 6 starts, the reference value calculating unit 53 sets the new reference value B(n) to the new calculated load F(n), as the stability inspection process.

Further, if the increase amount "F(n)−F(n−p3)" of the calculated load F per predetermined time duration p3 exceeds a second variable threshold ΔFp3 in the initial period after the motor 6 starts, the reference value calculating unit 53 calculates, as the new reference value B(n), a result of the weighted average of the new calculated load F(n) and the previous reference value B(n−1) that has the response speed faster than the first weighted average (hereinafter, the "second weighted average"), as the stability point search process. The second weighted average is expressed by the following equation (6) with the weight factor "Q".

[Eq. 6]

$$B(n) = \frac{(Q-1) \times B(n-1) + F(n)}{Q} \quad (6)$$

The weight factor "Q" of the second weighted average (Eq. 6) is less than the weight factor "M" of the first weighted average (Eq. 5).

If a difference between the calculated load F(n) and the reference value B(n) is continuously within a first range for a predetermined time duration or greater, the reference value calculating unit 53 sets the new reference value B(n) to the new calculated load F(n). Hereinafter, this process may be referred to as a "reference value follow-up process". A constant difference between the calculated load F(n) and the reference B(n) may be generated when the change in the first weighted average of the reference value B(n) is delayed relative to the change in the calculated load F(n). By performing the reference value follow-up process, this constant difference is immediately eliminated, thereby facilitating prevention of an error in the pinch determination.

The first range is, for example, a range in which the difference "F(n)–B(n)" between the calculated load F(n) and the reference value B(n) is greater than a threshold value Dmin1 and less than a threshold value Dmax.

With respect to the above, if the position of the window 3 detected in the opening/closing body position detecting unit 51 is within a predetermined range close to the fully closed position of the window 3, the reference value calculating unit 53 sets the new reference value B(n) to the new calculated load F(n) if the difference between the calculated load F(n) and the reference value B(n) is continuously within a second range for a predetermined time duration or greater. Here, the second range is expanded from the first range under the condition that the calculated load F(n) is less than the reference value B(n).

The second range is, for example, a range in which difference "F(n)–B(n)" between the calculated load F(n) and the reference value B(n) is greater than a threshold value Dmin2 and less than a threshold value Dmax. The threshold value Dmin2 of the second range is a negative value less than the threshold value Dmin1 of the first range. Near the fully closed position of window 3, a constant difference may be generated in a state where the calculated load F(n) is less than the reference value B(n), and the threshold value Dmin2 of the second range is set to include the constant difference.

The reference value calculating unit 53, for example, performs the reference value follow-up process in the above-described second range within a predetermined range close to the fully closed position and performs the reference value follow-up process in the above-described first range within the other range.

If a difference "|F(n)–B(n–1)|" between the new calculated load F(n) and the past reference value B(n–1) is greater than a difference threshold value ΔFB and the change amount "|F(n)–F(n–p2)|" of the calculated load F per predetermined time duration p2 is greater than a change threshold value ΔFp2, the reference value calculating unit 53 sets the new reference value B(n) to the past reference value B(n–1). That is, when the difference between the calculated load F and the reference value B suddenly increases while the calculated load F changes rapidly, the reference value calculating unit 53 rapidly increases the difference between the calculated load F and the reference value B by stopping the updating of the reference value B.

The disturbance detecting unit 54 monitors the change of the calculated load F(n) and detects the disturbance that causes the change of the calculated load F(n) based on the comparison of the change amount of the calculated load F(n) with a first disturbance threshold value ΔX1.

The disturbance detecting unit 54 includes a maximum value retaining unit 541, a disturbance determining unit 542, and a disturbance increment value calculating unit 543.

The maximum value retaining unit 541 retains a maximum value Fmax(n–1) of the calculated load F. If the new calculated load F(n) calculated in the load calculating unit 52 is greater than the retained maximum value Fmax(n–1), the maximum value retaining unit 541 retains the new calculated load F(n) as the maximum value Fmax(n–1).

The maximum value retaining unit 541 decreases the retained maximum value Fmax(n) with the lapse of time. For example, if the maximum value retaining unit 541 continuously retains the maximum value Fmax(n–1) as the new maximum value Fmax(n), the maximum value retaining unit 541 decreases the new maximum value Fmax(n) by a fixed value Ds from the maximum value Fmax(n–1). The fixed value Ds is a value set for each characteristic of the vehicle.

The disturbance determining unit 542 determines the disturbance causing the change of the calculated load F(n). For example, if the change amount "Fmax(n)–F(n)" of the calculated load F(n) from the maximum value Fmax(n) retained by the maximum value retaining unit 541 is greater than the first disturbance threshold value ΔX1, the disturbance determining unit 542 determines that there is a large change.

Additionally, for example, the disturbance determining unit 542 counts the number of times of alternately repeating cases that are a case in which the change amount "Fmax(n)–F(n)" exceeds a second disturbance threshold value ΔX2 due to the decrease in the calculated load F(n) and a case in which the change amount "Fmax(n)–F(n)" falls below a third disturbance threshold value ΔX3 due to the increase in the calculated load F(n), and determines that there is a small disturbance if the number of times exceeds a predetermined number. Here, ΔX1>ΔX2>ΔX3 is satisfied.

The disturbance determining unit 542 maintains a disturbance determination state for a certain period of time every time the disturbance determining unit 542 determines that there is disturbance. If the disturbance determining unit 542 determines that there is further disturbance in the disturbance determination state, the disturbance determining unit 542 maintains the disturbance determination state for a certain period of time after the determination is made.

If the disturbance determining unit 542 determines that there is disturbance, the disturbance increment value calculating unit 543 calculates a disturbance increment value ΔFX in accordance with the change amount "Fmax(n)–F(n)" of the calculated load F(n) from the maximum value Fmax(n).

The disturbance increment value calculating unit 543 updates the disturbance increment value ΔFX to be added to a pinch threshold value Fth in accordance with the maximum change amount "Fmax(n)–F(n)" of the calculated load F(n) from the maximum value Fmax(n), while the disturbance determination state is maintained by the disturbance determining unit 542. That is, the disturbance increment value calculating unit 543 changes the disturbance increment value ΔFX to a greater value if the calculated load F(n) greatly decreases in the disturbance determination state and a great change amount "Fmax(n)–F(n)" is obtained.

The pinch threshold setting unit 55 sets the pinch threshold value Fth that defines the upper limit of the calculated load F(n). For example, the pinch threshold value Fth defines an allowable range of the difference "F(n)−B(n)" between the calculated load F(n) and the reference B(n) (the excess amount of the calculated load F(n) relative to the reference value B(n)). In this case, the sum of the pinch threshold value Fth and reference value B(n) corresponds to the upper limit of the calculated load F(n).

The pinch threshold setting unit 55 switches a base value of the pinch threshold value Fth between the initial period after the motor 6 starts and the steady period after the initial period. Specifically, the pinch threshold setting unit 55 sets a starting threshold value Fth1 as the base value of the pinch threshold value Fth in the initial period and sets a steady-state threshold value Fth2 as the base value of the pinch threshold value Fth in the period after the initial period. The starting threshold value Fth1 is greater than the steady-state threshold value Fth2. This allows the opening/closing control device 100 according to the embodiment to prevent using a great change of the calculated load F(n) during the initial period to erroneously determine that an object is pinched.

If the pinch threshold setting unit determines that the calculated load F(n) does not increase linearly, the pinch threshold setting unit 55 increases the pinch threshold value Fth to the maximum value (for example, 512 [N]). For example, a rapid decrease of the calculated load F(n) may occur immediately after the motor 6 starts. In this case, the pinch threshold setting unit 55 determines that the calculated load F(n) does not increase linearly and increases the pinch threshold value Fth to the maximum value (for example, 512[N]). This allows the opening/closing control device 100 according to the embodiment to recognize that the operation of the window 3 is an operation in which an object is not pinched, substantially with certainty, and to avoid erroneously determining that an object is pinched during the operation of the window 3.

If the pinch threshold setting unit 55 detects the occurrence of the voltage change in the voltage supplied to the motor 6, the pinch threshold setting unit 55 increases the pinch threshold value Fth by an increment value calculated by the predetermined voltage change logic. For example, if the motor voltage V rises, the pinch threshold setting unit 55 adds an increment value $\Delta FV(n)$ in accordance with an increase $\Delta V(n)$ of the motor voltage V to the pinch threshold value Fth. The increment value $\Delta FV(n)$ is expressed by the following equation (7).

[Eq. 7]

$$\Delta FV(n)=K1\times\Delta V+K2\times\Delta FV(n-1) \quad (7)$$

In Eq. 7, "K1" is a constant term that relates to the magnitude of change of the calculated load F(n) in accordance with the increase $\Delta V(n)$ in the motor voltage V. "K2" is a constant term that defines the decrease rate of the increment value $\Delta FV(n)$ when the increase $\Delta V(n)$ of the motor voltage V is zero and is set to a positive number less than 1. As the constant K2 approaches zero, the decrease rate of the increment $\Delta FV(n)$ increases. If the result of Eq. 7 is negative, the pinch threshold setting unit 55 sets the increment value $\Delta FV(n)$ to zero.

When the disturbance detecting unit 54 detects the generation of the disturbance causing the change of the calculated load F(n), the pinch threshold setting unit 55 increases the pinch threshold value Fth by the increment value calculated by the predetermined disturbance detecting logic.

For example, if the disturbance detecting unit 54 detects the disturbance, the pinch threshold setting unit 55 adds the disturbance increment value $\Delta FX$ (that is, the disturbance increment value $\Delta FX$ in accordance with the change amount of the calculated load F(n) caused by the disturbance) calculated by the disturbance increment value calculating unit 543 to the pinch threshold value Fth. The pinch threshold setting unit 55 adds the disturbance increment value $\Delta FX$ to the pinch threshold value Fth while the disturbance determining unit 542 maintains the disturbance determination state and ends the addition of the disturbance increment $\Delta FX$ when the disturbance determination state is completed.

If the pinch threshold setting unit 55 detects that the position of the window 3 is within a predetermined area near the upper end position (the fully closed position), the pinch threshold setting unit 55 increases the pinch threshold value Fth by an increment value, calculated by an upper end threshold adding logic, that increases as the position of the window 3 approaches the fully closed position. This allows the opening/closing control device 100 according to the embodiment to avoid erroneously determining that an object is pinched when the sliding friction increases in the predetermined area near the upper end position.

Figure 5:
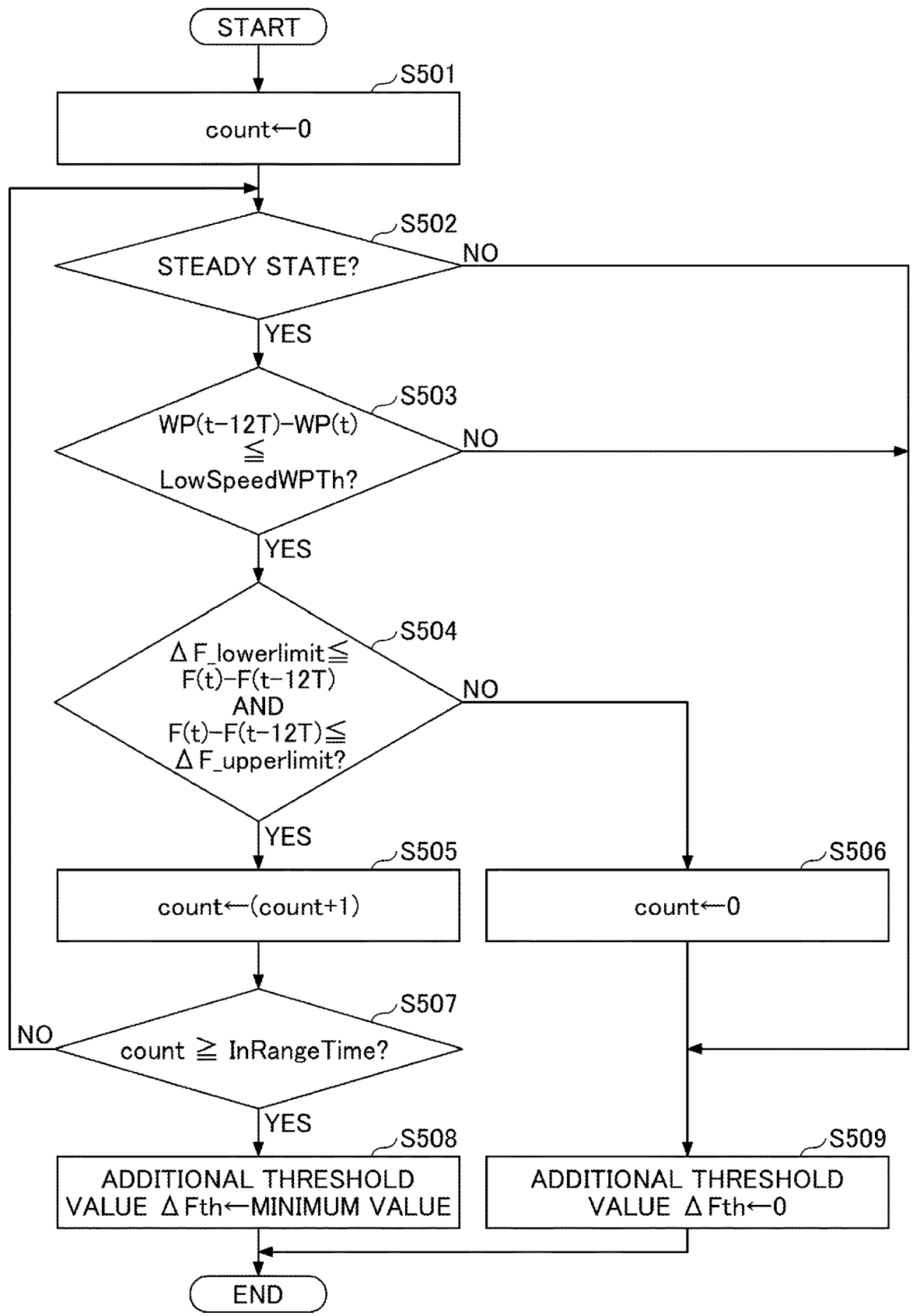
FIG. 5 is a flowchart illustrating an example of a procedure of a pinch threshold adjustment process based on low-speed pinch detection performed by a pinch threshold setting unit according to the embodiment.

Further, if the pinch threshold setting unit 55 detects the occurrence of the low speed pinch by performing a series of pinch threshold adjustment processes illustrated in FIG. 5, the pinch threshold setting unit 55 decreases the pinch threshold value Fth to a minimum value (for example, −512 [N]). This allows the opening/closing control device 100 according to the embodiment to immediately determine that an object is pinched and to perform pinch prevention control to reverse the rotation of the motor 6.

Specifically, the pinch threshold setting unit 55 calculates the speed of the window 3 based on the change in the position of the window 3 detected by the opening/closing body position detecting unit 51. The pinch threshold setting unit 55 decreases the pinch threshold value Fth on the assumption that the occurrence of the low speed pinch is detected, if a state, in which the calculated speed of the window 3 is less than or equal to a first predetermined threshold value and a temporal change of the calculated load calculated by the load calculating unit is greater than or equal to a second predetermined threshold value and less than or equal to a third predetermined threshold value, continues for a certain period of time or greater.

Particularly, according to the present embodiment, if a state, in which the calculated speed of the window 3 is less than or equal to the first predetermined threshold value and the temporal change of the calculated load calculated by the load calculating unit is greater than or equal to the second predetermined threshold value and less than or equal to the third predetermined threshold value, continues for the certain period of time, the pinch threshold setting unit 55 decreases the pinch threshold value Fth by a constant value.

If the calculated load F(n) exceeds the upper limit set based on the pinch threshold value Fth, the pinch determining unit 56 determines that an object is pinched by the window 3. For example, if the difference "F(n)−B(n)" between the calculated load F(n) and the reference value B(n) is greater than the pinch threshold value Fth, the pinch determining unit 56 determines that an object is pinched by the window 3.

For example, each time the new calculated load F(n) is calculated in the load calculating unit 52, the pinch determining unit 56 determines whether a pattern of change of the calculated load F matches a predetermined pattern of monotonic increase based on a series of calculated loads F including the new calculated load F(n). If a first condition in which the difference "F(n)−B(n)" between the calculated load F(n) and the reference value B(n) is greater than the pinch threshold value Fth and a second condition in which the pattern of change of the calculated load F matches the pattern of monotonic increase are satisfied, the pinch determining unit 56 determines that the pinch occurs.

If the increment amount "F(n)−F(n−q3)" of the calculated load F per predetermined time q3 is greater than a threshold value ΔFh indicating a criterion for the occurrence of the pinch of a hard object, the pinch determining unit 56 determines that the pinch occurs if a third condition in which the change of the calculated load F is accelerated is satisfied, in addition to the above-described first condition and second condition.

The motor control unit 57 generates a control signal of the motor 6 in accordance with an operation signal input at the operating unit 40 and outputs the control signal to the motor driving circuit 10. The motor control unit 57 generates the control signal to be output to the motor driving circuit 10 so as to satisfy conditions such as rotation directions and rotation speeds of the motor 6 preset for a closing operation and an opening operation.

If the pinch determining unit 56 determines that an object is pinched, the motor control unit 57 performs the pinch prevention control to reverse the rotation of the motor 6. For example, if the pinch determining unit 56 determines that the pinch occurs during the closing operation, the motor control unit 57 reverses the motor 6 to perform the opening operation and stops the window 3 at an appropriate position.

Example of a Processing Procedure Performed by the Processing Unit 50

FIG. 3 is a flowchart illustrating an example of a processing procedure performed by the processing unit 50 according to the embodiment. The processing unit 50 repeatedly performs a series of processes illustrated in FIG. 3 while the motor 6 is being driven.

First, in step S301, the opening/closing body position detecting unit 51 detects the position of the window 3 in the opening/closing operation of the window 3 based on the ripple generated by the current flowing through the motor 6.

Next, in step S302, the processing unit 50 determines whether the position of the window 3 detected in step S301 is within a predetermined non-reversing area where the rotation of the motor 6 is not reversed. For example, the predetermined non-reversing area is an area within a predetermined range (e.g., 4 mm) from the fully closed position.

In step S302, if it is determined that the position of the window 3 is within the predetermined non-reversing area (step S302: YES), the processing unit 50 ends the series of processes illustrated in FIG. 3.

In step S302, if it is determined that the position of the window 3 is not within the predetermined non-reversing area (step S302: NO), in step S303, the processing unit 50 determines which of a first stage S1 to a fourth stage S4 illustrated in FIG. 4 the opening/closing control device is in, based on elapsed time from the start time of the motor 6 (a value of "n").

Next, in step S304, the load calculating unit 52 calculates the load F(n) based on the motor current Im(n) detected by the current detecting unit 30 and the motor voltage V(n) detected by the voltage detecting unit 20 by using the above-described equations (1) to (4).

Next, in step S305, the reference value calculating unit 53 calculates the result of the weighted average of the calculated load F(n) calculated in step S304 as the reference value B(n).

Next, in step S306, the disturbance detecting unit 54 detects the disturbance causing the change of the calculated load F(n) based on the comparison between the change amount of the calculated load F(n) calculated in step S304 and the first disturbance threshold ΔX1.

Next, in step S307, the pinch threshold setting unit 55 sets the pinch threshold value Fth that defines the allowable range of the difference "F(n)−B(n)" between the calculated load F(n) calculated in step S304 and the reference value B(n) calculated in step S305. At this time, if the pinch threshold setting unit 55 detects that the calculated load F(n) does not increase linearly, the voltage change is generated, or the disturbance causing the change of the calculated load F(n) is generated, the pinch threshold setting unit 55 increases the pinch threshold value Fth by the increment value corresponding to the change factor. Additionally, at this time, if the pinch threshold setting unit 55 detects that the position of the window 3 is within the predetermined area near the upper end position (the fully closed position), the pinch threshold setting unit 55 increases the pinch threshold value Fth by an increment value that increases as the position of the window 3 approaches the fully closed position. Additionally, at this time, if the pinch threshold setting unit 55 detects the occurrence of the low speed pinch by performing a series of pinch threshold adjustment processes illustrated in FIG. 5, the pinch threshold setting unit 55 decreases the pinch threshold value Fth to the minimum value (for example, −512 [N]).

Next, in step S308, the pinch determining unit 56 determines whether an object is pinched by the window 3, based on the difference "F(n)−B(n)" between the calculated load F(n) calculated in step S304 and the reference value B(n) calculated in step S305, and the pinch threshold value Fth set in step S307.

In step S308, if it is determined that an object is not pinched by the window 3 because the above described difference "F(n)−B(n)" is less than the pinch threshold value Fth (NO in step S309), the processing unit 50 ends the series of processes illustrated in FIG. 3.

In step S310, if it is determined in step S308 that an object is pinched by the window 3 because the above described difference "F(n)−B(n)" is greater than the pinch threshold value Fth (YES in step S309), the motor control unit 57 performs the pinch prevention control to reverse the rotation of the motor 6. Subsequently, the processing unit 50 ends the series of processes illustrated in FIG. 3.

Example of the Stage

FIG. 4 is a diagram illustrating an example of the stage of the opening/closing control device 100 according to the embodiment. As illustrated in FIG. 4, the opening/closing control device 100 according to the embodiment includes four stages (a first stage S1 to a fourth stage S4) according to the elapsed time from the start of the motor 6.

As illustrated in FIG. 4, the rotational state of the motor 6 is unstable in the first stage S1 to the third stage S3 and stable in the stage S4.

Additionally, as illustrated in FIG. 4, the opening/closing control device 100 performs the determination of the pinch of a soft object in the second stage S2 or later and does not perform the determination in the first stage S1 immediately after the motor 6 starts. Thus, the opening/closing control device 100 does not perform the setting of the pinch threshold value Fth (the calculation of the increment value or the like) in the first stage S1.

Additionally, as illustrated in FIG. 4, in the second stage S2 to the third stage S3 in which the rotational state of the motor 6 is unstable, the opening/closing control device 100 can prevent erroneous determination of the pinch of an object by increasing the pinch threshold value Fth.

Additionally, as illustrated in FIG. 4, the opening/closing control device 100 performs the stability point search process in the first stage S1 and the second stage S2, and does not perform the process in the third stage S3 or later.

Additionally, as illustrated in FIG. 4, the opening/closing control device 100 does not perform the disturbance detection process in the first stage S1 and the second stage S2, but performs the process in the third stage S3 or later.

Procedure of the Pinch Threshold Adjustment
Process Based on the Low Speed Pinch Detection FIG. 5 is a flowchart illustrating an example of a procedure of the pinch threshold adjustment process based on the low speed pinch detection performed by the pinch threshold setting unit 55 according to the embodiment.

First, in step S501, the pinch threshold setting unit 55 sets a variable count to 0. Next, in step S502, the pinch threshold setting unit 55 determines whether the state is steady.

In step S502, when it is determined that the state is not steady (NO in step S502), the pinch threshold setting unit 55 sets the additional amount ΔFth of the pinch threshold to 0 (step S509). Subsequently, the pinch threshold setting unit 55 ends the series of processes illustrated in FIG. 5.

If it is determined in step S502 that the state is steady (YES in step S502), in step S503, the pinch threshold setting unit 55 determines whether the pinch threshold setting unit satisfies the fourth condition described below.

$$WP(t-12T)-WP(t) \leq \text{LowSpeed}WPTh \quad \text{(Fourth Condition)}$$

Here, in the fourth condition above, WP indicates the position of the window. Additionally, t indicates time, and T indicates a processing period. Further, LowSpeedWPTh is a predetermined constant (in units of ripple count/T) indicating the change amount of the window 3 that is used to determine that the rate of increase of the window 3 is low, and a suitable value is preset for the window 3 to be controlled. Here, LowSpeedWPTh corresponds to a "first predetermined threshold value". The fourth condition is a requirement to determine that "the calculated speed of the opening/closing device is less than or equal to the first predetermined threshold value".

If it is determined in step S503 that the fourth condition is not satisfied (NO in step S503), in step S509, the pinch threshold setting unit 55 sets the additional amount ΔFth of the pinch threshold value to 0. Subsequently, the pinch threshold setting unit 55 ends the series of processes illustrated in FIG. 5.

If it is determined in step S503 that the fourth condition is satisfied (YES in step S503), in step S504, the pinch threshold setting unit 55 determines whether both of the fifth condition below and the sixth condition below are satisfied.

$$\Delta F\_\text{lowerlimit} \leq F(t)-F(t-12T) \quad \text{(Fifth Condition)}$$

$$F(t)-F(t-12T) \leq \Delta F\_\text{upperlimit} \quad \text{(Sixth Condition)}$$

Here, in the above-described fifth condition and sixth condition, F indicates the calculated load. Additionally, t indicates time, and T indicates a processing period. ΔF_lowerlimit and ΔF_upperlimit are predetermined constants (in units of [N]) that define the lower limit value and the upper limit value of the slope of the calculated load F, and suitable values are preset for the window 3 to be controlled. Here, ΔF_upperlimit corresponds to a "second predetermined threshold value," and ΔF_upperlimit corresponds to a "third predetermined threshold value". The fifth condition is a condition for determining that "the temporal change of the calculated load calculated by the load calculating unit is greater than or equal to the second predetermined threshold". The sixth condition is a requirement for determining that "the temporal change of the calculated load calculated by the load calculating unit is less than or equal to the third predetermined threshold value".

If it is determined in step S504 that at least either the fifth condition or the sixth condition is not satisfied (NO in step S504), in step S506, the pinch threshold setting unit 55 sets the variable count to 0. In step S509, the pinch threshold setting unit 55 sets the additional amount ΔFth of the pinch threshold to 0. Subsequently, the pinch threshold setting unit 55 ends the series of processes illustrated in FIG. 5.

If it is determined in step S504 that both the fifth condition and the sixth condition are satisfied (YES in step S504), in step S505, the variable count is added by 1. In step S507, the pinch threshold setting unit 55 determines whether the seventh condition described below is satisfied.

$$\text{count} \geq \text{InRangeTime} \quad \text{(Seventh Condition)}$$

Here, in the seventh condition described above, InRangeTime is a predetermined constant (in units of [times]) indicating the number of times the process is performed to determine the low speed pinch detection, and a suitable value is preset for the window 3 to be controlled. The seventh condition is a requirement for determining that a state, in which the temporal change of the calculated load calculated by the load calculating unit is greater than or equal to the second predetermined threshold value and is less than or equal to the third predetermined threshold value, continues for a certain period of time or greater.

If it is determined in step S507 that the seventh condition is not satisfied (NO in step S507), the pinch threshold setting unit 55 returns the processing to step S502.

If it is determined in step S507 that the seventh condition is satisfied (YES in step S507), in step S508, the pinch threshold setting unit 55 sets the additional amount ΔFth of the pinch threshold to a constant value (for example, −512 [N]) to decrease the pinch threshold value Fth, on the assumption that the low speed pinch is detected. Subsequently, the pinch threshold setting unit 55 ends the series of processes illustrated in FIG. 5.

Example

Figure 6:
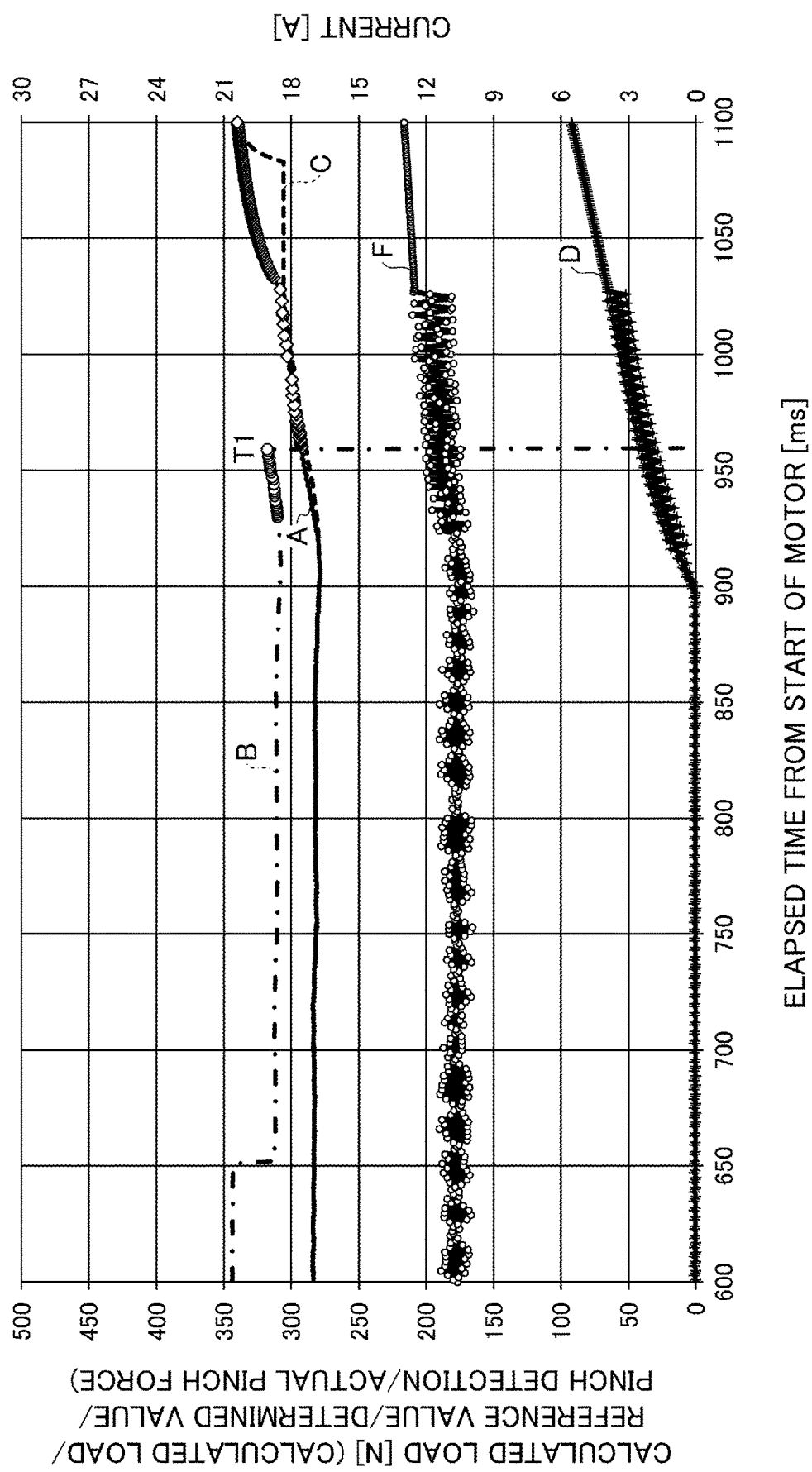
FIG. 6 illustrates an example of a change in each value caused when a low speed pinch occurs at a window in the opening/closing control device according to the embodiment.
Figure 7:
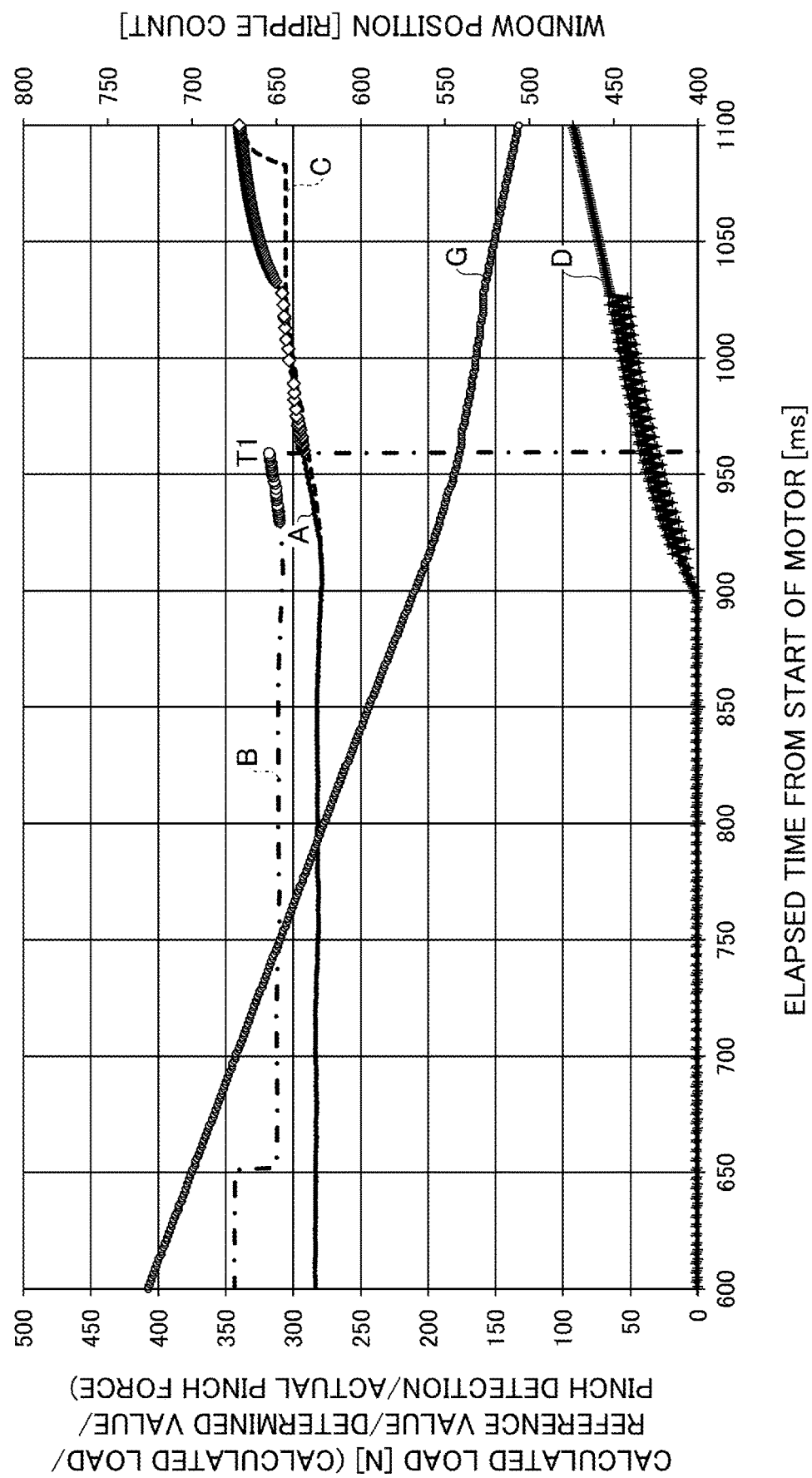
FIG. 7 illustrates an example of a change in each value caused when the low speed pinch occurs at the window in the opening/closing control device according to the embodiment.
Figure 8:
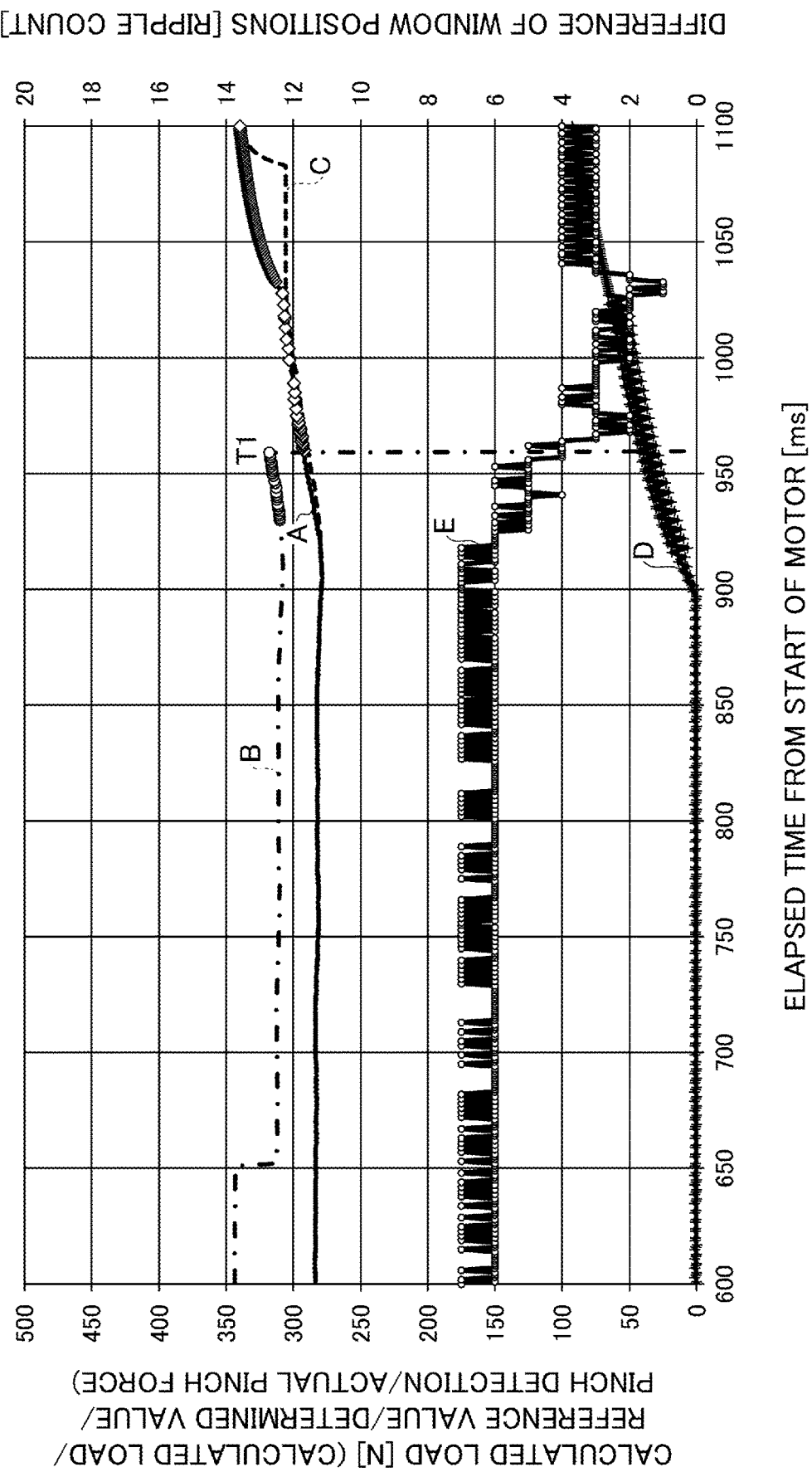
FIG. 8 illustrates an example of a change in each value caused when the low speed pinch occurs at the window in the opening/closing control device according to the embodiment.

Next, an example of the opening/closing control device 100 according to the embodiment will be described with reference to FIGS. 6 to 8. FIGS. 6 to 8 illustrate an example of the change in each value when the slow pinch is caused by the window 3 in the opening/closing control device 100 according to the embodiment.

In FIGS. 6 to 8, A indicates the calculated load F(n). The rhombus dots illustrated superimposed on A indicate that the pinch is detected. B (the dash-dot-dash line) indicates the determination value (the upper limit defined by the pinch threshold value Fth). The circular dots illustrated superimposed on B indicate that linearity (monotonically increasing) of the calculated load is detected. C (the dashed line) indicates the reference value. D indicates the actual pinch force. In FIG. 6, F indicates the current [A]. In FIG. 7, G indicates the position of the window [ripple count]. In FIG. 8, E indicates the difference [ripple count] in the position of the window.

As illustrated in FIGS. 6 to 8, all of the above-described fourth to seventh conditions are satisfied at the timing T1 if a state, in which the calculated load F(n) gradually rises, continues for a certain period of time by performing the pinch threshold adjustment process based on the low speed pinch detection, and thus the opening/closing control device 100 according to the embodiment decreases the pinch threshold value Fth to a constant value (e.g., −512 [N]). As a result, the opening/closing control device 100 according to the embodiment determines that the calculated load F(n) is greater than the determination value and that an object is pinched by the window 3, thereby performing the pinch prevention control.

Comparative Example

Next, a comparative example of the opening/closing control device 100 according to the embodiment will be described with reference to FIGS. 9 to 12.

Figure 9:
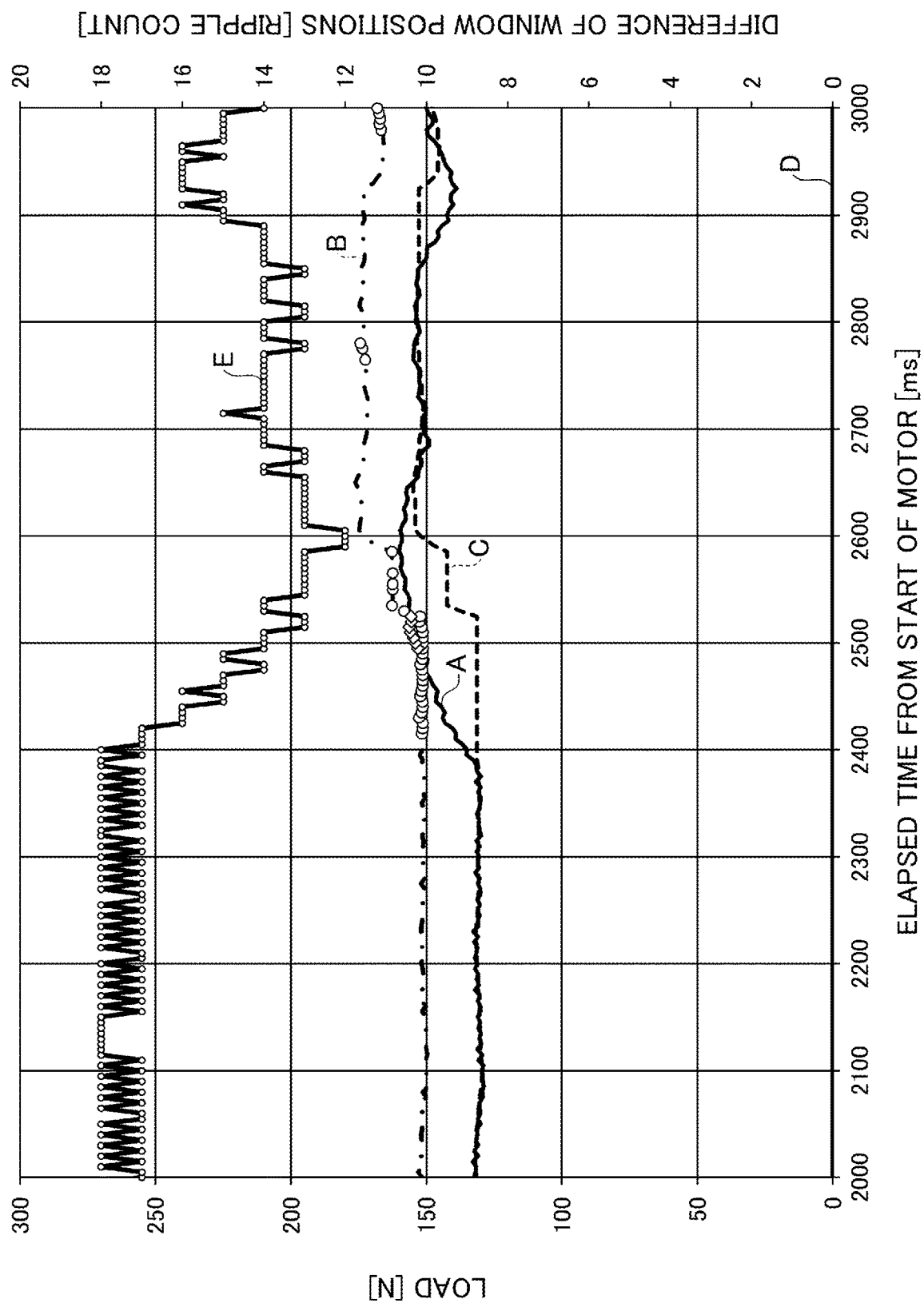
FIG. 9 illustrates a change in each value caused when the pinch threshold adjustment process is not performed based on the low speed pinch detection and when a window closing operation is performed in the opening/closing control device according to the embodiment.
Figure 10:
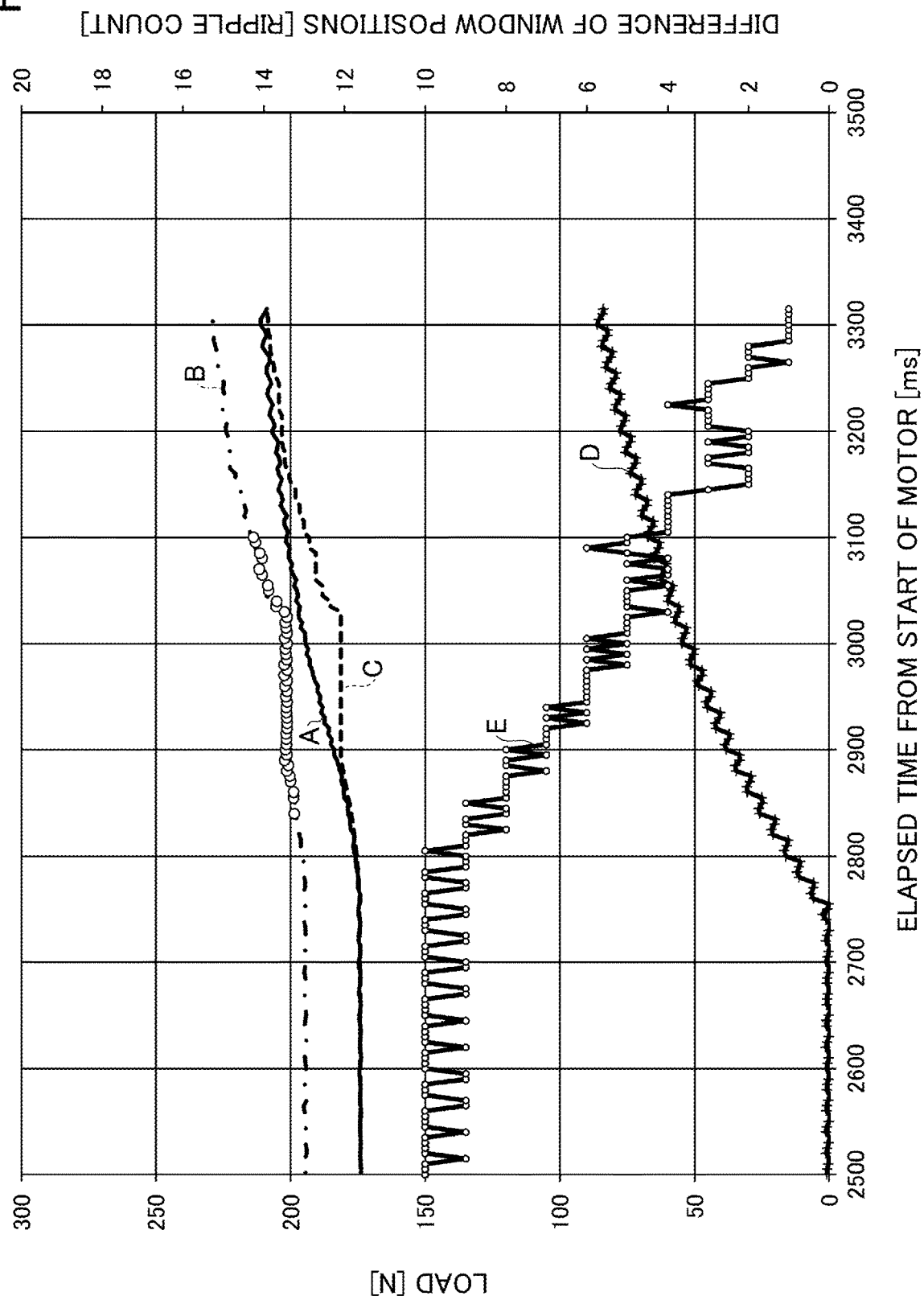
FIG. 10 illustrates a change in each value caused when the pinch threshold adjustment process is not performed based on the low speed pinch detection and when the low speed pinch occurs at the window in the opening/closing control device according to the embodiment.

FIG. 9 illustrates the change in each value in the opening/closing control device 100 according to the embodiment when the pinch threshold adjustment process is not performed based on the low speed pinch detection and when the window 3 is fully closed. FIG. 10 illustrates the change in each value in the opening/closing control device 100 according to the embodiment when the pinch threshold adjustment process is not performed based on the low speed pinch detection and when the low speed pinch is caused by the window 3.

Figure 11:
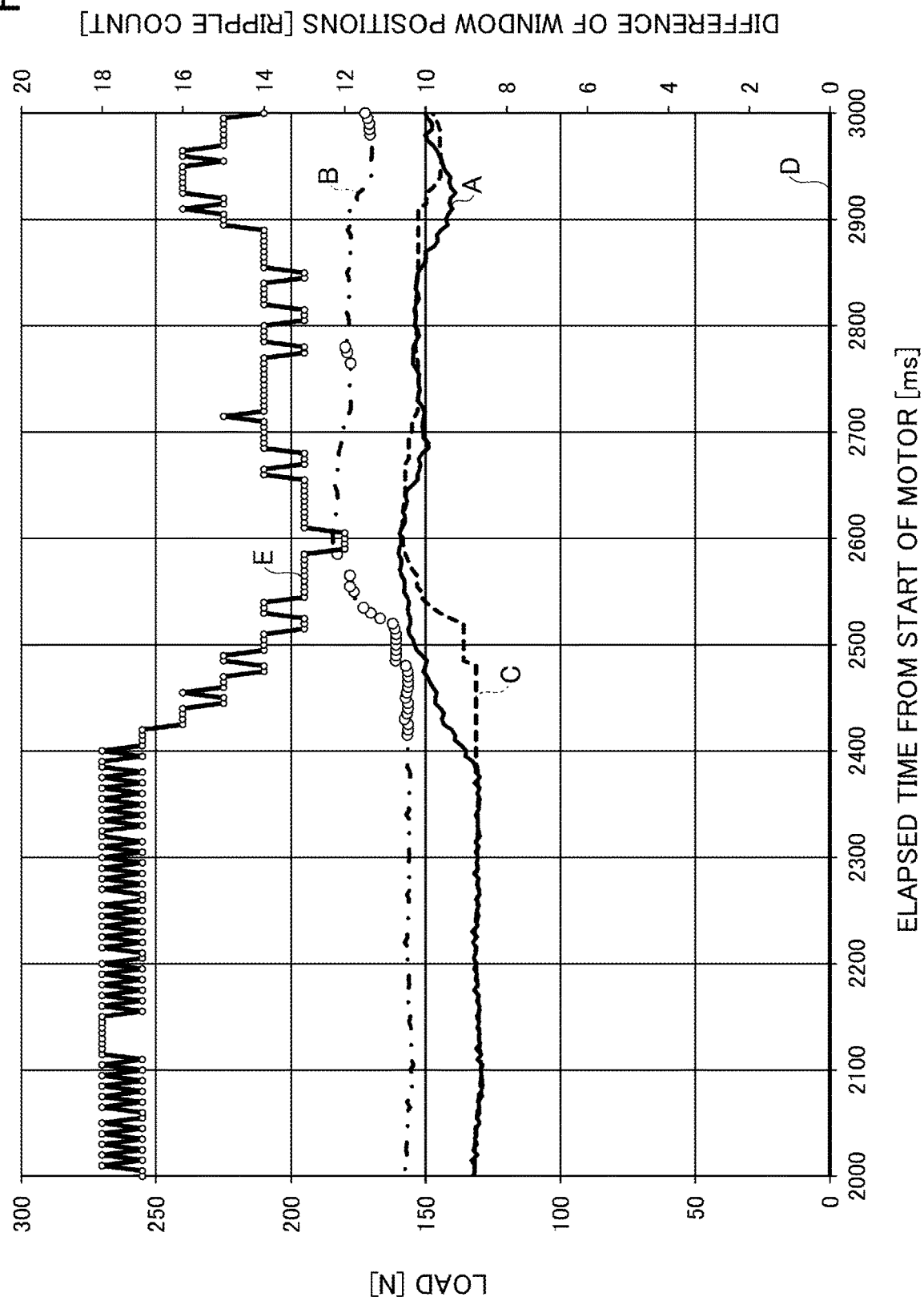
FIG. 11 illustrates a change in each value caused when the pinch threshold adjustment process is performed based on the low speed pinch detection and when the window closing operation is performed in the opening/closing control device according to the embodiment.
Figure 12:
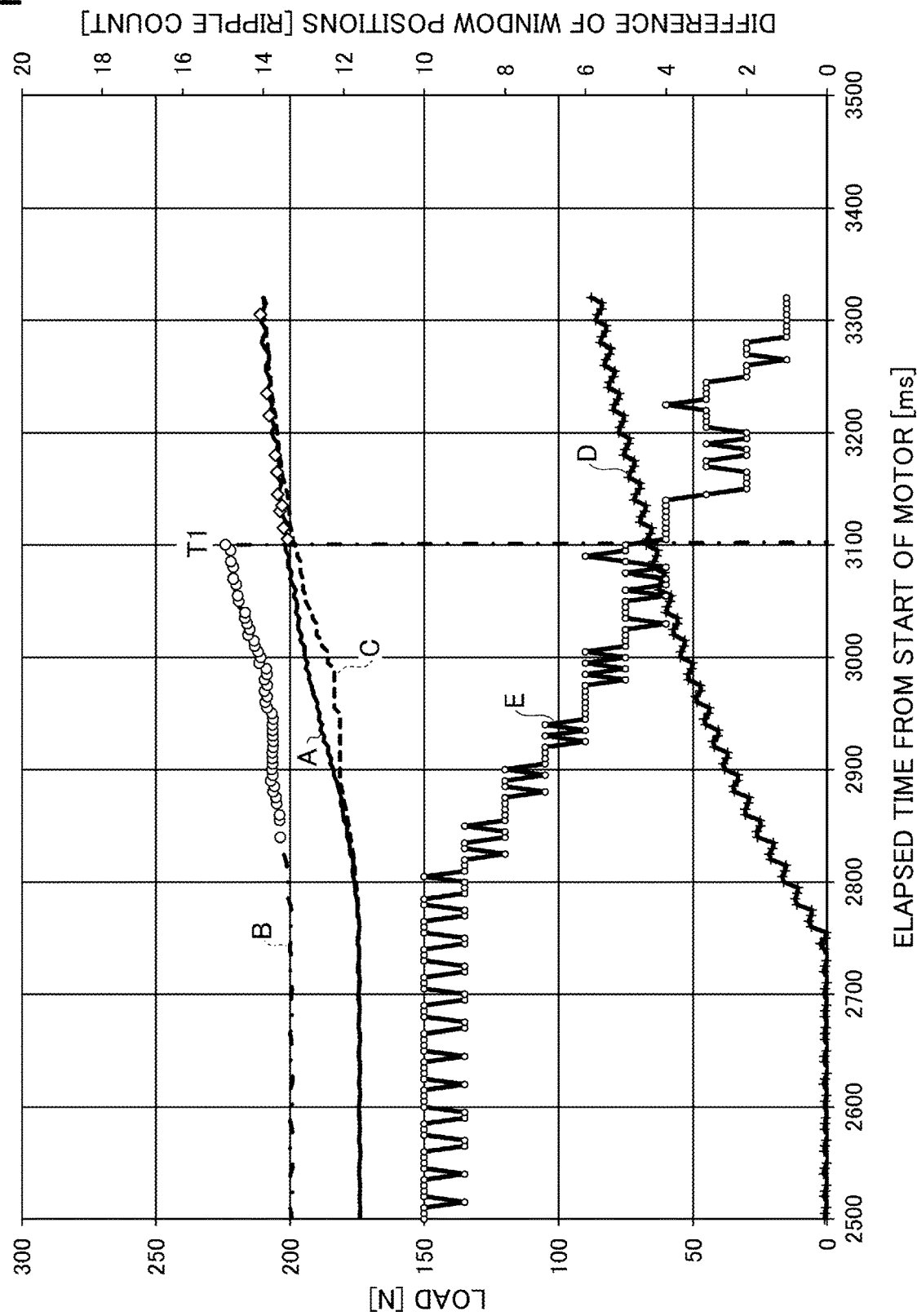
FIG. 12 illustrates a change in each value caused when the pinch threshold adjustment process is performed based on the low speed pinch detection and when the low speed pinch occurs at the window in the opening/closing control device according to the embodiment.

FIG. 11 illustrates the change in each value in the opening/closing control device 100 according to the embodiment when the pinch threshold adjustment process is performed based on the slow speed pinch detection and when the window 3 is fully closed. FIG. 12 illustrates the change in each value in the opening/closing control device 100 according to the embodiment when the pinch threshold adjustment process is performed based on the slow speed pinch detection and when the slow speed pinch is caused by the window 3.

In FIGS. 9 to 12, A indicates the calculated load F(n). The rhombus dots illustrated superimposed on A indicate that a pinch is detected. B (the dash-dot-dash line) indicates the determination value (the upper limit defined by the pinch threshold value Fth). The circular dots illustrated superimposed on B indicate that linearity (monotonically increasing) of the calculated load is detected. C (the dashed line) indicates the reference value. D indicates the actual pinch force. E indicates the difference in the position of the window.

In the example illustrated in FIG. 10, regardless of the occurrence of the low speed pinch, because the pinch threshold adjustment process based on the low speed pinch detection is not performed, the calculated load F(n) does not become greater than the determination value, and thus it is determined that an object is not pinched by the window 3. Therefore, the pinch prevention control is not performed.

With respect to the above, in the example illustrated in FIG. 12, because the pinch threshold adjustment process based on the low speed pinching detection is performed, all of the above-described fourth to seventh conditions are satisfied at the timing T1 when a state, in which the calculation load F(n) gradually rises, continues for a certain period of time, and thus the pinch threshold value Fth is decreased to a constant value (for example, −512[N]). As a result, because the calculated load F(n) becomes greater than the determination value, it is determined that an object is pinched by the window 3, and the pinch prevention control is performed.

As described above, the opening/closing control device 100 according to the embodiment is the opening/closing control device 100 that controls the opening/closing operation of the window 3 by driving the motor 6, and includes the current detecting unit 30 configured to detect the current flowing to the motor 6, the voltage detecting unit 20 configured to detect the voltage supplied to the motor 6, the opening/closing body position detecting unit 51 configured to detect the position of the window 3 based on the rotation of the motor 6, the load calculating unit 52 configured to calculate the load F(n) in the opening/closing operation of the window 3 based on the current detected by the current detecting unit 30, the pinch threshold setting unit 55 configured to set the pinch threshold value Fth that defines the upper limit of the calculated load F(n) calculated by the load calculating unit 52, the pinch determining unit 56 configured to determine that the object is pinched by the window 3 when the calculated load F(n) calculated by the load calculating unit 52 exceeds the upper limit set by the pinch threshold value Fth, and the motor control unit 57 configured to perform pinch prevention control to reverse the rotation of the motor 6 when the pinch determining unit 56 determines that the object is pinched by the window 3. The pinch threshold setting unit 55 calculates the speed of the window 3 based on the change in the position of the window 3 that is detected by the opening/closing body position detecting unit 51 and decreases the pinch threshold value Fth if a state, in which the calculated speed of the window 3 is less than or equal to the first predetermined threshold value and the temporal change in the calculated load F(n) calculated by the load calculating unit 52 is greater than or equal to the second predetermined threshold value and less than or equal to the third predetermined threshold value, continues for a certain period of time or greater.

This allows the opening/closing control device 100 according to the embodiment to detect the occurrence of the low speed pinch of the object caused by the window 3 with high accuracy, and when the occurrence of the low speed pinch is detected, the opening/closing control device 100 can perform the pinch prevention control immediately.

In the opening/closing control device 100 according to the embodiment, the pinch threshold setting unit 55 decreases the pinch threshold value Fth by a constant value if a state, in which the speed of the window 3 is less than or equal to the first threshold value and the temporal change in the calculated load F(n) calculated by the load calculating unit 52 is greater than or equal to the second threshold value and less than or equal to the third threshold value, continues for a certain period or greater.

This allows the opening/closing control device 100 according to the embodiment to determine that an object is pinched more accurately, and thus can prevent erroneous determination of the pinch of the object.

Additionally, in the opening/closing control device 100 according to the embodiment, the pinch threshold setting unit 55 increases the pinch threshold value Fth by an increment value that increases as the position of the window 3 approaches the position of the upper end, when it is detected that the position of the window 3 is within a predetermined area near the position of the upper end.

This allows the opening/closing control device 100 according to the embodiment to prevent erroneous determination of the pinch of the object due to the increase in the calculated load F(n) due to an increase in the sliding resistance of the window 3.

Further, in the opening/closing control device 100 according to the embodiment, the pinch threshold setting unit 55 increases the pinch threshold value Fth, if the pinch threshold setting unit 55 detects that the calculated load F(n) calculated by the load calculating unit 52 does not increase linearly, the voltage change is generated in the voltage detected by the voltage detecting unit 20, or the disturbance affecting the calculated load F(n) calculated by the load calculating unit 52 is generated.

This allows the opening/closing control device 100 according to the embodiment to prevent erroneous determination of the pinch of the object due to the change of the calculated load F(n).

Here, in the opening/closing control device 100 according to the embodiment, the pinch determining unit 56 may calculate the speed of the window 3 based on the change in the position of the window 3 that is detected by the opening/closing body position detecting unit 51 and determines that the pinch occurs, if a state, in which the calculated speed of the window 3 less than or equal to the first predetermined threshold value and the temporal change in the calculated load F(n) calculated by the load calculating unit 52 is greater than or equal to the second predetermined threshold value and less than or equal to the third predetermined threshold value, continues for a certain period of time or greater.

Even in this case, the opening/closing control device 100 according to the embodiment can detect the occurrence of the low speed pinch of the object caused by the window 3 with high accuracy, and when the occurrence of the low speed pinch is detected, the opening/closing control device 100 can perform the pinch prevention control immediately.

While the embodiments of the invention have been described in detail above, the invention is not limited to these embodiments, and various modifications or variations can be made within the scope of the subject matter of the invention as recited in the claims.

What is claimed is:

1. An opening/closing control device for controlling an opening/closing operation of an opening/closing body driven by a motor, the opening/closing control device comprising:
a current detector configured to detect a current flowing to the motor;
a voltage detector configured to detect a voltage supplied to the motor;
a processor; and
a memory storing program instructions that cause the processor to:
detect a position of the opening/closing body based on rotation of the motor;
calculate a load of the opening/closing body in the opening/closing operation based on the current detected by the current detector;
set a pinch threshold value that defines an upper limit of the calculated load;
determine that an object is pinched by the opening/closing body in a case where the calculated load exceeds the upper limit defined by the pinch threshold value; and
perform a pinch prevention control process in response to determining that the object is pinched, the pinch prevention control process reversing the rotation of the motor,
wherein the processor calculates a speed of the opening/closing body based on a change in the detected position of the opening/closing body, and decreases the pinch threshold value in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

2. The opening/closing control device as claimed in claim 1, wherein the processor decreases the pinch threshold value by a constant value in the case where the state, in which the speed of the opening/closing body is less than or equal to the first predetermined threshold value, and the temporal change in the calculated load is greater than or equal to the second predetermined threshold value and less than or equal to the third predetermined threshold value, continues for the certain period of time.

3. The opening/closing control device as claimed in claim 1, wherein the processor detects the position of the opening/closing body based on a ripple included in the current detected by the current detector.

4. The opening/closing control device as claimed in claim 1, wherein in response to detecting that the position of the opening/closing body is within a predetermined area near an upper end position, the processor increases the pinch threshold value by an increment value that increases as the position of the opening/closing body approaches the upper end position.

5. The opening/closing control device as claimed in claim 1, wherein in response to detecting that the calculated load does not increase linearly, a voltage change is generated in the voltage detected by the voltage detector, or a disturbance affecting the calculated load is generated, the processor increases the pinch threshold value.

6. An opening/closing control device for controlling an opening/closing operation of an opening/closing body driven by a motor, the opening/closing control device comprising:
a current detector configured to detect a current flowing to the motor;
a voltage detector configured to detect a voltage supplied to the motor;
a processor; and
a memory storing program instructions that cause the processor to:
detect a position of the opening/closing body based on rotation of the motor;
calculate a load of the opening/closing body in the opening/closing operation based on the current detected by the current detector;
set a pinch threshold value that defines an upper limit of the calculated load;
determine that an object is pinched by the opening/closing body in a case where the calculated load exceeds the upper limit defined by the pinch threshold value; and
perform a pinch prevention control process in response to determining that the object is pinched, the pinch prevention control process reversing the rotation of the motor,
wherein the processor calculates a speed of the opening/closing body based on a change in the detected position of the opening/closing body, and determines that the object is pinched, in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

7. An opening/closing control method for controlling an opening/closing operation of an opening/closing body driven by a motor, the opening/closing control method comprising:
- detecting a position of the opening/closing body based on rotation of the motor;
- calculating a load of the opening/closing body in the opening/closing operation based on a current flowing to the motor;
- setting a pinch threshold value that defines an upper limit of the calculated load;
- determining that an object is pinched by the opening/closing body in a case where the calculated load exceeds the upper limit defined by the pinch threshold value; and
- performing a pinch prevention control process in response to determining that the object is pinched, the pinch prevention control process reversing the rotation of the motor,
- wherein the setting of the pinch threshold value includes calculating a speed of the opening/closing body based on a change in the detected position of the opening/closing body, and decreasing the pinch threshold value in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

8. An opening/closing control method for controlling an opening/closing operation of an opening/closing body driven by a motor, the opening/closing control method comprising:
- detecting a position of the opening/closing body based on rotation of the motor;
- calculating a load of the opening/closing body in the opening/closing operation based on a current flowing to the motor;
- setting a pinch threshold value that defines an upper limit of the calculated load calculated in the load calculating step;
- determining that an object is pinched by the opening/closing body in a case where the calculated load calculated in the load calculating step exceeds the upper limit defined by the pinch threshold value; and
- performing a pinch prevention control process in response to determining that the object is pinched, the pinch prevention control process reversing the rotation of the motor,
- wherein the determining includes calculating a speed of the opening/closing body based on a change in the detected position of the opening/closing body, and determining that the object is pinched, in a case where a state, in which the calculated speed of the opening/closing body is less than or equal to a first predetermined threshold value, and a temporal change in the calculated load is greater than or equal to a second predetermined threshold value and less than or equal to a third predetermined threshold value, continues for a certain period of time or greater.

* * * * *